United States Patent
Daga

(10) Patent No.: US 8,645,820 B2
(45) Date of Patent: Feb. 4, 2014

(54) METHOD AND APPARATUS FOR PROVIDING COMB TEXT FIELD INPUTS ON A MOBILE DEVICE

(75) Inventor: Subhash Singh Daga, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 186 days.

(21) Appl. No.: 13/410,985

(22) Filed: Mar. 2, 2012

(65) Prior Publication Data

US 2013/0232401 A1    Sep. 5, 2013

(51) Int. Cl.
*G06F 17/00* (2006.01)

(52) U.S. Cl.
USPC .......................................................... 715/244

(58) Field of Classification Search
USPC ......... 715/224, 225, 227, 228, 243, 244, 245, 715/246, 247
See application file for complete search history.

(56) References Cited

U.S. PATENT DOCUMENTS

| | | | | |
|---|---|---|---|---|
| 5,459,826 A | * | 10/1995 | Archibald | 715/209 |
| 5,499,366 A | * | 3/1996 | Rosenberg et al. | 1/1 |
| 5,619,636 A | * | 4/1997 | Sweat et al. | 715/202 |
| 5,929,854 A | * | 7/1999 | Ross | 715/783 |
| 6,031,989 A | * | 2/2000 | Cordell | 717/109 |
| 2007/0143750 A1 | * | 6/2007 | Varela et al. | 717/174 |
| 2008/0016499 A1 | * | 1/2008 | Jones et al. | 717/124 |
| 2008/0022197 A1 | * | 1/2008 | Bargeron et al. | 715/246 |
| 2012/0226971 A1 | * | 9/2012 | Tocchini et al. | 715/234 |

OTHER PUBLICATIONS

PDF Expert, downloaded on Jun. 18, 2012 from website: http://readdle.com/products/pdf_expert_ipad.
PDF Expert, "iTunes Preview" downloaded on Jun. 8, 2012 from website: http://itunes.apple.com/us/app/pdf_expert_fill-forms_annotate/id393316844?mt=8.
U.S. Appl. No. 13/169,913, filed Jun. 27, 2011, entitled "User Interface Element on Mobile Device for Comb Text Field Inputs", Anand Taralika (inventor), 28 pages.

* cited by examiner

*Primary Examiner* — Laurie Ries
(74) *Attorney, Agent, or Firm* — Moser Taboada

(57) ABSTRACT

A computer implemented method and apparatus for providing comb field text inputs on a mobile device comprising displaying a document on a mobile device, detecting entry of a comb field of the document on the mobile device, the comb field comprising at least one comb cell, determining a size of a canvas that fits onto the comb field on the mobile device, and generating a mobile platform canvas based on the comb field parameters, the mobile platform canvas capable of receiving at least one text character input.

20 Claims, 9 Drawing Sheets

METHOD AND APPARATUS FOR PROVIDING COMB TEXT FIELD INPUTS ON A MOBILE DEVICE

BACKGROUND OF THE INVENTION

1. Field of the Invention

Embodiments of the present invention generally relate to document usability on mobile devices, and more particularly, to a method and apparatus for providing comb text field inputs on a mobile device.

2. Description of the Related Art

The PDF form experience has become a popular means for receiving information from an online user. Often consisting of text fields, the form is an easy way for a user to provide information. A comb text field is a text field that is divided into several combs, i.e., boxes or cells that are of equal dimension and laid out contiguously. Each box contains at most, a single character. This is often used for entering social security numbers or account numbers that have a defined number of characters. The comb text field provides a means for the user to clearly see the information being entered and allows the form author to specify the number of boxes that should be generated, thereby limiting the length of the user input.

However, utilization of comb text fields has been limited to desktop computers or laptops. For example, on a desktop computer, a form filler can fill a comb field in a manner similar to a regular text field, but in a comb field, as the user types the input, the contiguous boxes are filled one character per box. Further, the characters are center aligned and equally spaced from each other. The user can select a box and choose to edit or delete the character in that box. As expected, when a character in a box is deleted, the characters in the boxes to the right are shifted one box to the left.

Technical limitations have prevented utilization of comb text fields in mobile devices. In particular, the user interface utilized on mobile devices simply does not support interactive comb text fields. Accordingly, when a comb text field is rendered on a mobile device, a user is unable to interact with the comb text field.

Therefore, there is a need in the art for a method and apparatus for providing comb text field inputs on a mobile device.

SUMMARY OF THE INVENTION

Embodiments of the present invention comprise a method and apparatus for providing comb text field input on a mobile device. In an embodiment, a computer implemented method for providing comb field text input on a mobile device comprises displaying a document on a mobile device. The mobile device detects entry of a comb field of the document, wherein the comb field comprises at least one comb cell. A size of a canvas that fits onto the comb field on the mobile device is determined, and a mobile platform canvas based on the comb field parameters is generated. The mobile platform canvas is capable of receiving at least one text character input.

Figures 1, 2:
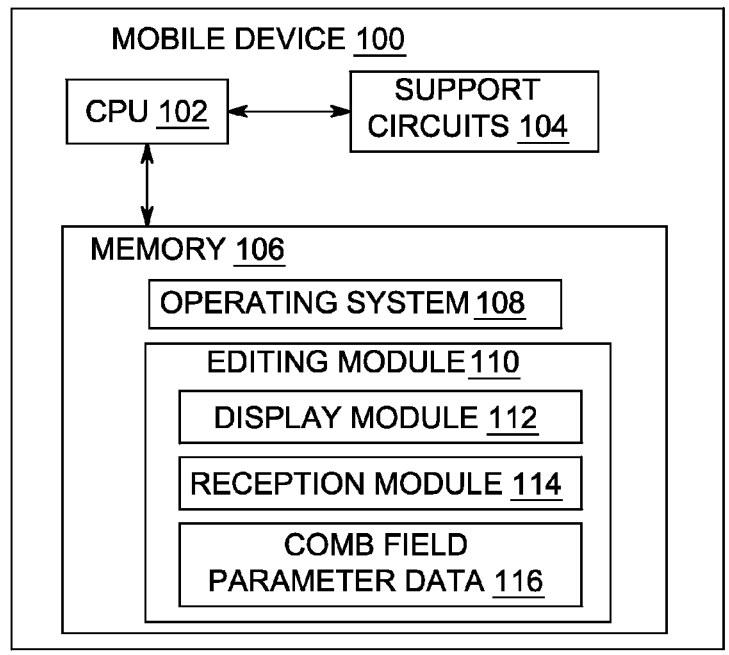
FIG. 1 depicts a block diagram of a mobile device for providing comb text field inputs, according to one or more embodiments.
FIG. 2 depicts a schematic representation of a document being displayed on a mobile device of FIG. 1, according to one or more embodiments.

While the method and apparatus is described herein by way of example for several embodiments and illustrative drawings, those skilled in the art will recognize that the method and apparatus for providing comb text field inputs on a mobile device is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for providing comb text field inputs on a mobile device defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for providing comb text field inputs for a document on a mobile device. In one embodiment, a mobile platform canvas is generated as a proxy for receiving inputs associated with a comb field. The inputs typically include text characters, and the comb field typically has one or more contiguous cells, each cell configured for receiving and displaying one character. In desktop environments, the input is stored and displayed in the comb field, while in the present embodiments for the mobile device, the input associated with the comb field is stored separately and displayed in the mobile platform canvas, superimposed on the comb field. The mobile platform canvas displays each character superimposed at the center of the comb field cells, based on the font used, comb field cell size, and the location of the comb field within the document. In addition, a cursor is animated in the mobile platform canvas to be superimposed on the comb field cell, either at the center, or immediately after a character within (or superimposed on) a cell.

Various embodiments of an apparatus and method for providing comb text field inputs for a document on a mobile device are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention comprise a method and apparatus for providing comb text field inputs for a document on a mobile device while substantially preserving the user experience similar to a comb field text input in a desktop environment. Specifically, embodiments of the present invention comprise a method and apparatus for providing a blank, invisible text field over the comb field, processing input characters to match the display dimension and characteristics of the comb field, and displaying the input characters to be superimposed at the center of contiguous comb field cells. Advantageously, embodiments of the present invention allow for providing and editing comb field text inputs on a mobile device by simulating a display superimposed on the comb field(s).

FIG. 1 depicts a block diagram of a computing system that is a mobile device 100 for providing comb text field inputs, according to one or more embodiments. The mobile device 100 is a type of computing device (e.g., a Personal Digital Assistant (PDA), a tablet, a mobile phone and/or the like) known to one of ordinary skill in the art. The mobile device 100 comprises a Central Processing Unit (CPU) 102, support circuits 104, and a memory 106. The CPU 102 may comprise one or more commercially available microprocessors or microcontrollers that facilitate data processing and storage. The various support circuits 104 facilitate the operation of the CPU 102 and include one or more clock circuits, power supplies, cache, input/output circuits, and the like. The memory 106 comprises at least one of Read Only Memory (ROM), Random Access Memory (RAM), disk drive storage, optical storage, removable storage and/or the like. The memory 106 comprises an operating system (OS) 108, and a mobile platform canvas editing module 110. The OS 108 may comprise various commercially known mobile operating systems. The editing module 110 includes a display module 112, a reception module 114 and comb field parameter data 116.

The editing module 110 is configured to receive text input typically associated with a comb field, and store and display the input via a mobile platform canvas. The editing module 110 activates when a user selects a comb field in the document for editing. The editing module 110 allows the user to input data for the comb field, for example, using the reception module 114, and view and edit the data on the mobile device display as if the input data was stored in the comb field using the display module 112. The reception module 114 is configured to receive input from a keyboard on the mobile device, a virtual on-screen keyboard provided on the display of the mobile device or from a tap on a touch screen of a mobile device. The reception module 114 can detect input when a user types a new character via a keyboard, when the user presses the "delete" key on the keyboard, or when the user taps on a particular comb field cell to enter a character in a particular location. When the user accesses a comb field, the reception module 114 generates the mobile platform canvas and superimposes it over the comb field. When the user moves away from the comb field, for example, by clicking on a different portion of the document, or scrolling to a different page of the document, the editing module 110 saves the input data. In one embodiment, the input data is saved in comb field parameter data 116. The comb field parameter data 116 also includes the comb field location, the size of the comb field, the number of cells in the comb field, the maximum number of characters allowed in the comb field, the font used, and the value (existing characters) if any.

FIG. 2 depicts a document 200 being accessed at the mobile device 100 of FIG. 1. The document 200 has several comb fields, for example comb fields 202, 204, and 206 associated with a descriptor "Passenger Name", and a comb field 208 associated with a descriptor "Date of Travel". Each of the comb fields has one or more cells for receiving text inputs, for example, the comb field 208 includes several cells 210. The document 200 may be used for receiving, displaying and editing comb text inputs on the mobile device as implemented using the computing system of FIG. 1, according to one or more embodiments. As the user enters information, the comb field inputs are displayed in a mobile platform canvas to provide the user with the same comb text input experience as provided in desktop applications.

Figure 3:
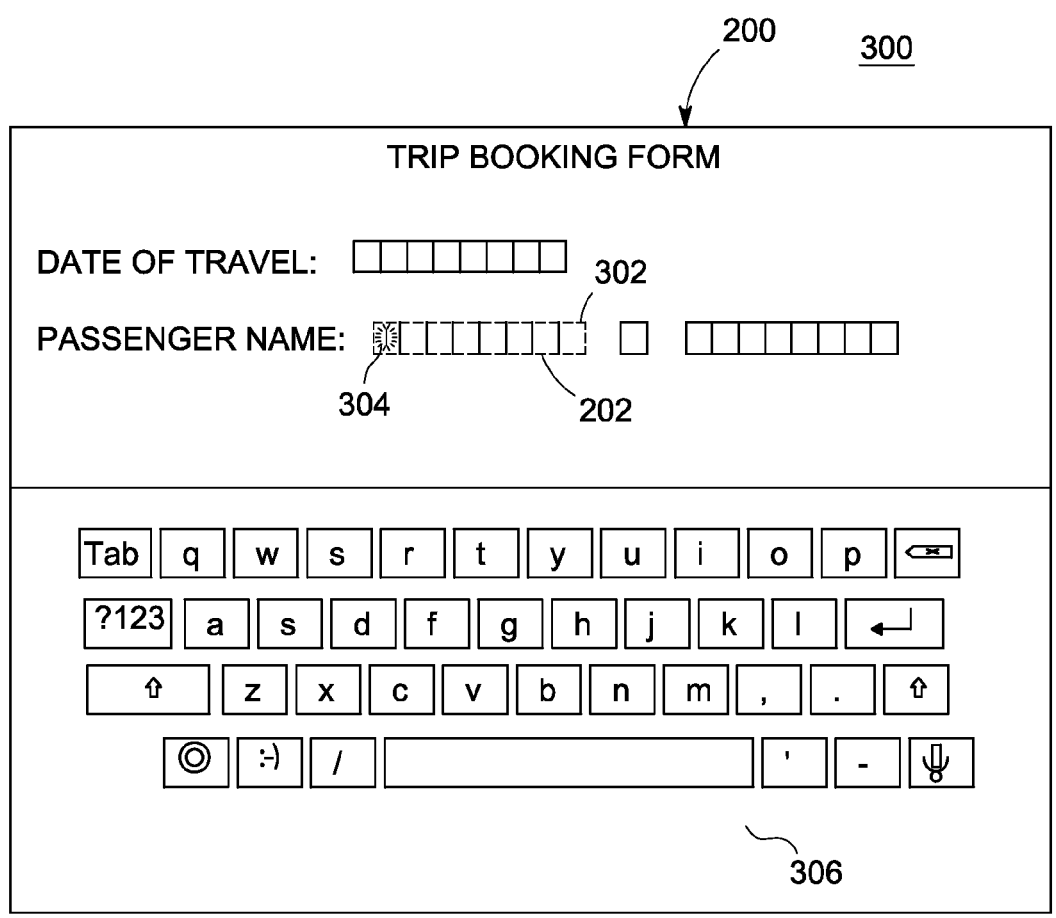
FIG. 3 depicts a schematic representation of an exemplary generation of a mobile platform canvas as implemented using the mobile device of FIG. 1, according to one or more embodiments.

FIG. 3 depicts the document 200 being accessed, and the comb field 202 being selected for editing, on the mobile device of FIG. 1. According to one embodiment, a mobile platform canvas 302, illustrated in FIG. 3 by dotted lines, is generated and superimposed on the comb field 202 when the comb field is accessed by a user. The mobile platform canvas 302 simulates the comb field 202 in receiving, storing and editing text input. The simulation is implemented by calculating dimensions of the comb field 202, the dimensions of each of the cell(s) of the comb field 202, the font used for the comb field 202, and the location of the comb field 202 within the document, for example, as (x,y) coordinates of the top left corner of the comb field 202 on the document page. A display position for each input character in the mobile platform canvas 302 is determined by identifying the corresponding location within the cell of the comb field 202. The input character is then displayed at the determined display position in the mobile platform canvas 302, but appears to be displayed at the center of the comb field cell as the mobile platform canvas 302 is superimposed on the comb field 202. As the user types a new character, a precise location for each of the characters in the field is recalculated and each character is redrawn at the location's coordinates.

In one embodiment, a cursor 304 is created and displayed at the center of a cell of the comb field 202. The cursor is displayed in the mobile platform canvas 302, but appears to be displayed at the center of the comb field cell as the mobile platform canvas 302 is superimposed on the comb field 202. When moved, the cursor 304 will appear to be moving from cell to cell giving the illusion that the user is filling in a comb field. The input is provided by the user, for example, through a keyboard 306 at the mobile device of FIG. 1.

Figure 4A:
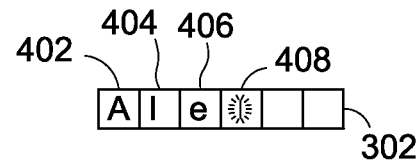
FIG. 4 depicts a schematic representation of text edit operations and cursor positioning on the mobile platform canvas as implemented using the mobile device of FIG. 1, according to one or more embodiments.
Figure 4B:
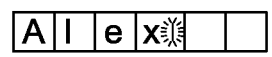

FIG. 4A-4E depicts editing on a mobile platform canvas used to simulate comb field inputs, according to one or more embodiments. The mobile platform canvas 302 is superimposed on the comb field (not shown in FIGS. 4A-4E), and several inputs have been provided. In the embodiment illustrated by FIG. 4A, the letters "A", "I", "e" and the cursor 304 denoted at positions 402, 404, 406 and 408 respectively appear to be displayed in the comb field. However, they are actually displayed in the mobile platform canvas 302 and the mobile platform canvas 302 is superimposed over the comb field. The positions 402, 404, 406 and 408 are at the center of the corresponding comb field cells. In one embodiment, for example, as illustrated by FIG. 4B, a new character "x" is entered by the user. When a new character is entered, the precise location for each character in the mobile platform canvas 302, including the new character "x", is recalculated and each character is redrawn at those coordinates on the screen. The cursor position is also recalculated and redrawn accordingly. This gives the user the illusion that their information is being entered into the actual comb field.

Figure 4C:
Figure 4D:
Figure 4E:
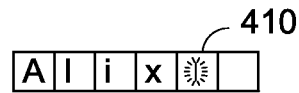

According to another embodiment illustrated by FIG. 4C, the user realizes that an error has been made by providing the character "e". Accordingly, the user moves the cursor (by using arrows, or tapping) to the position before "e", and as illustrated in FIG. 4D, deletes the character "e". It is appreciated that in an alternate embodiment, the user may position the cursor to a position immediately after "e", and select the delete key to delete the character "e", and obtain similar results. When the user performs the deletion, the precise location for each character remaining is recalculated and each character is redrawn at those coordinates on the screen. The cursor position is also recalculated and redrawn accordingly. The character "x" earlier at position 408 will now be displayed at position 406. According to one embodiment, as illustrated by FIG. 4E, a new character "i" is input by user to be inserted between characters "I" and "x". The insertion is effected by providing the character input "i" while the cursor is in between characters "I" and "x". As described above, a precise location for each character, including the new character "i", is recalculated and each character is redrawn at those coordinates on the screen. The cursor position is also recalculated and redrawn accordingly. The character "i" is then positioned at 406, while character "x" is located at position 408. The cursor is repositioned at 410. Accordingly, the edit operations on the mobile platform canvas 302 give the illusion that inputs are being made and edited on an actual comb field.

Figure 5:
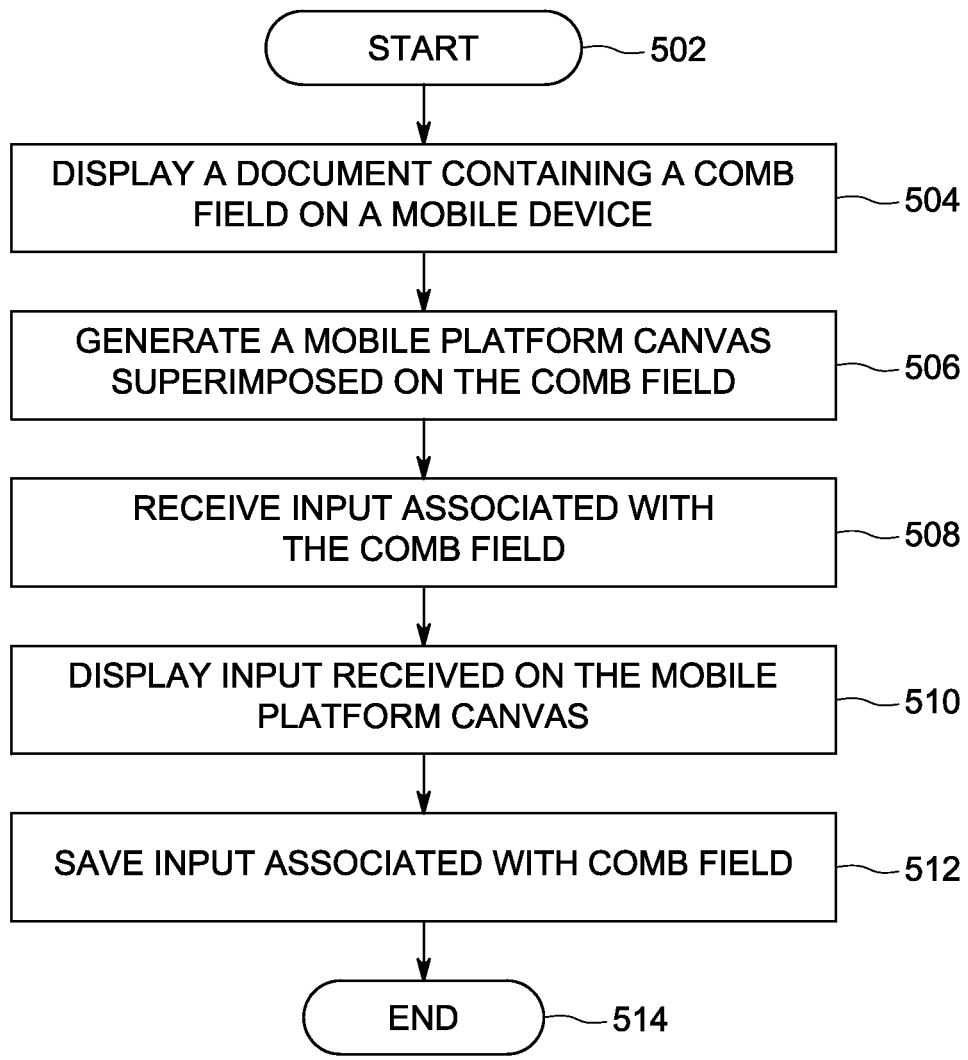
FIG. 5 depicts a flow diagram of a method for providing comb text field inputs on a mobile device as an exemplary implementation of the editing module of FIG. 1, according to one or more embodiments.

FIG. 5 depicts a flow diagram of a method 500 for providing comb text field inputs on a mobile device as an exemplary implementation of the editing module 110 of FIG. 1, according to one or more embodiments. The method 500 is initiated when a user navigates to the comb field. The method 500 starts at step 502, and proceeds to step 504. At step 504, the method 500 displays a document having a comb field on a mobile device. The method 500 proceeds to step 506. At step 506, the method 500 generates a mobile platform canvas on the mobile device, as described in method 600 below, and superimposes the mobile platform canvas on the comb field. The method 500 proceeds to step 508. At step 508, the method 500 receives, input associated with the comb field. The input is intended to be provided in the comb fields, however, since inputs cannot be made directly to the comb fields on mobile devices, and in the present embodiments, the input received are actually not made to the comb fields, the input received is referred to as input associated with the comb field. The method 500 proceeds to step 510. At step 510, the method 500 displays the input associated with the comb field on the mobile platform canvas superimposed on to the comb field, such that each character of the input appears contiguously as provided in the input, and is positioned at the center of the cell of the comb field underlying the mobile platform canvas. The method 500 proceeds to step 512. At step 512, the method 500 saves the mobile platform canvas location and the input associated with the comb field. The data is saved in the comb field parameter data 116 of FIG. 1 when the user navigates away from the comb field. The method 500 proceeds to step 514 and ends.

Figure 6:
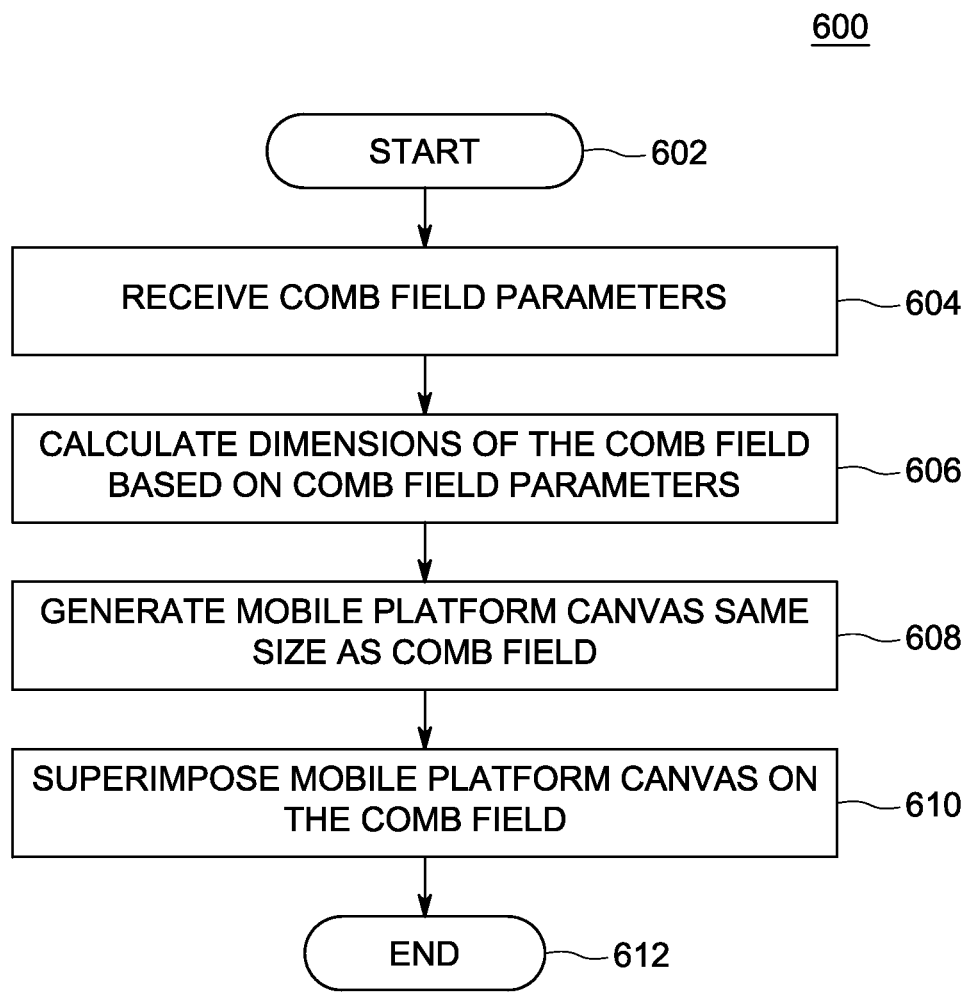
FIG. 6 depicts a flow diagram of a method for generating a mobile platform canvas as one exemplary implementation of the display module of FIG. 1, according to one or more embodiments.

FIG. 6 depicts a flow diagram of a method 600 for generating a mobile platform canvas as one exemplary implementation of the display module 112 of FIG. 1, according to one or more embodiments. The method 600, according to one embodiment, generates and superimposes a mobile platform canvas on a comb field.

The method 600 starts at step 602, and proceeds to step 604. At step 604, the method 600 receives one or more comb field parameters for the comb field accessed by the user. The method 600 gathers information about the comb field from a PDF document such as field dimension (height and width in pixels, and top-left (x,y) coordinate), the maximum number of characters allowed, the field's value (which can be empty), and font used. In one embodiment, the maximum number of characters allowed in the comb field equals the number of cells in the comb field. In various embodiments, the size of the comb field may be obtained from the number of cells in the comb field and dimensions of the comb field cells. The method 600 proceeds to step 606. At step 606, the method 600 calculates dimensions of the comb field based on the one or more comb field parameters. The method 600 proceeds to step 608. At step 608, the method 600 generates a mobile platform canvas the same size as the comb field, and proceeds to step 610. At step 610, the method 600 superimposes the mobile platform canvas over the comb field. The method 600 ends at step 612.

Figure 7:
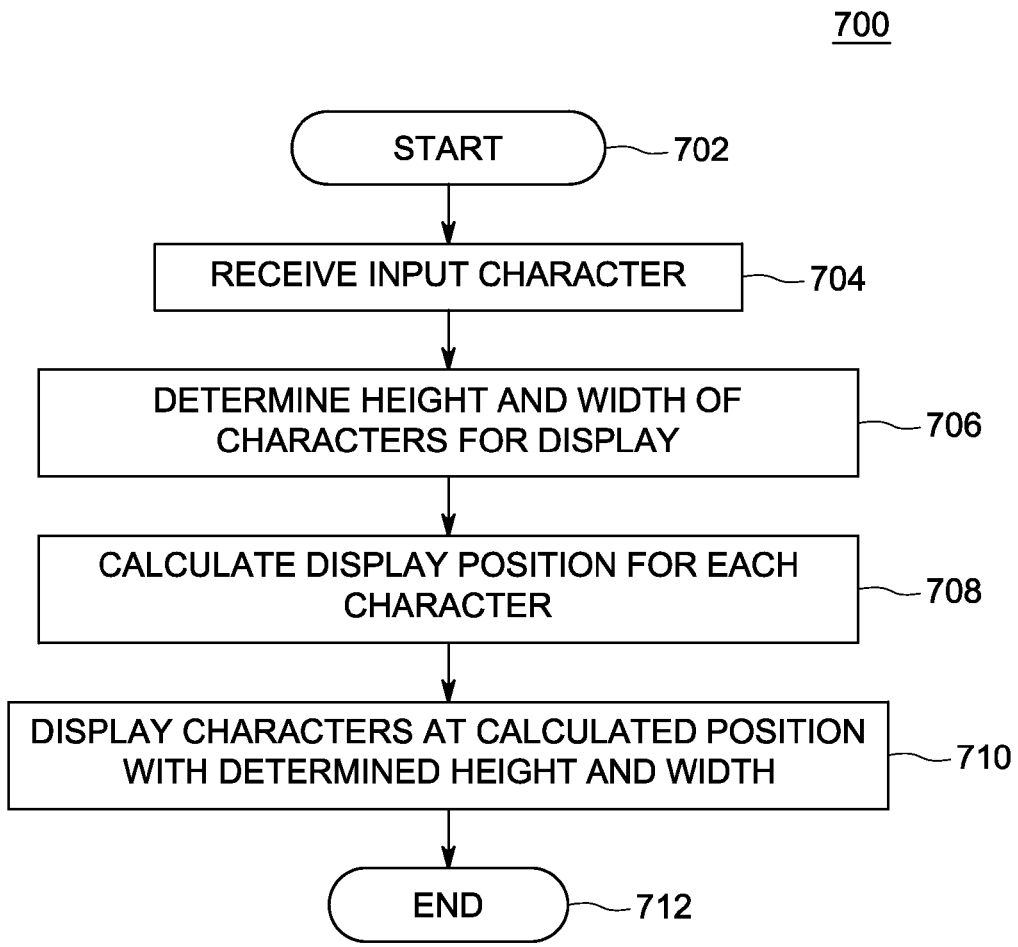
FIG. 7 depicts a flow diagram of a method for displaying an input character on a mobile platform canvas as another exemplary implementation of the display module of FIG. 1, according to one or more embodiments.

FIG. 7 depicts a flow diagram of a method 700 for displaying an input character on a mobile platform canvas as another exemplary implementation of the display module 112 of FIG.

1, according to one or more embodiments. The method 700, according to one embodiment, receives and displays an input character on the mobile platform canvas such that the input character appears to be entered in the correct position in the comb field.

The method 700 starts at step 702, and proceeds to step 704. At step 704 the method 700 receives an input character. The method 700 proceeds to step 706. At step 706, the method 700 determines the height and width of each character in the mobile platform canvas, including the received input character. The method 700 proceeds to step 708. At step 708, a precise location in the mobile platform canvas is calculated for each character, including the new character. The method 700 proceeds to step 710. At step 710, the characters are displayed at the calculated position with the determined height and width. Each character is redrawn at the calculated coordinates in the mobile platform canvas. Because the mobile platform canvas is superimposed on the comb field, the coordinates place each character in what appears to be the center of each box of the comb field. This gives the illusion that the user is inputting information into the actual comb field. The method 700 ends at step 712.

Figure 8:
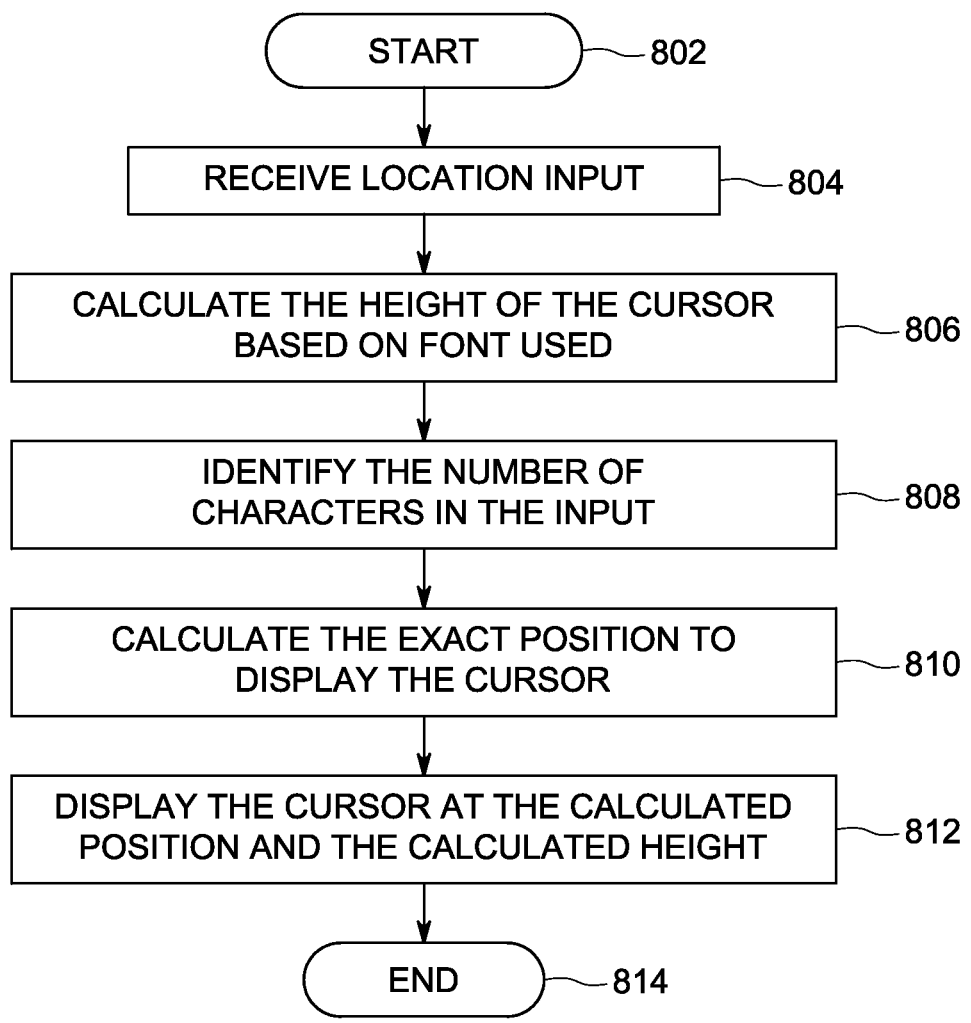
FIG. 8 depicts a flow diagram of a method for displaying a cursor on a mobile platform canvas as another exemplary implementation of the display module of FIG. 1, according to one or more embodiments.

FIG. 8 depicts a flow diagram of a method 800 for displaying a cursor on a mobile platform canvas as another exemplary implementation of the display module 112 of FIG. 1, according to one or more embodiments. The method 800, according to one embodiment, receives a location input for a cursor and displays the cursor on the mobile platform canvas such that the cursor appears to be positioned at a corresponding position in the comb field.

The method 800 begins at step 802, and proceeds to step 804. At step 804, a location input for the cursor is received. The method 800 proceeds to step 806. At step 806, the method 800 calculates the height of the cursor based on the font used in the comb field. According to certain embodiments, the width of the cursor is a predetermined constant size. The method 800 proceeds to step 808. At step 808, the method 800 identifies the number of characters already provided in the input associated with the comb field, and proceeds to step 810. At step 810, the method 800 calculates the position for displaying the cursor. The calculation of the position is made based on the dimensions of the cells of the comb field that would be required to accommodate the characters provided as input as identified at the step 808. In one embodiment, the cursor will be displayed immediately next to the previous character that was input. In another embodiment, the cursor will be displayed at a position corresponding to the center of a cell to the right of the previous character that was input. The method 800 proceeds to step 812. At step 812, the method 800 displays the cursor at the calculated position and with the calculated height. The method 800 proceeds to step 814 and ends.

Figure 9:
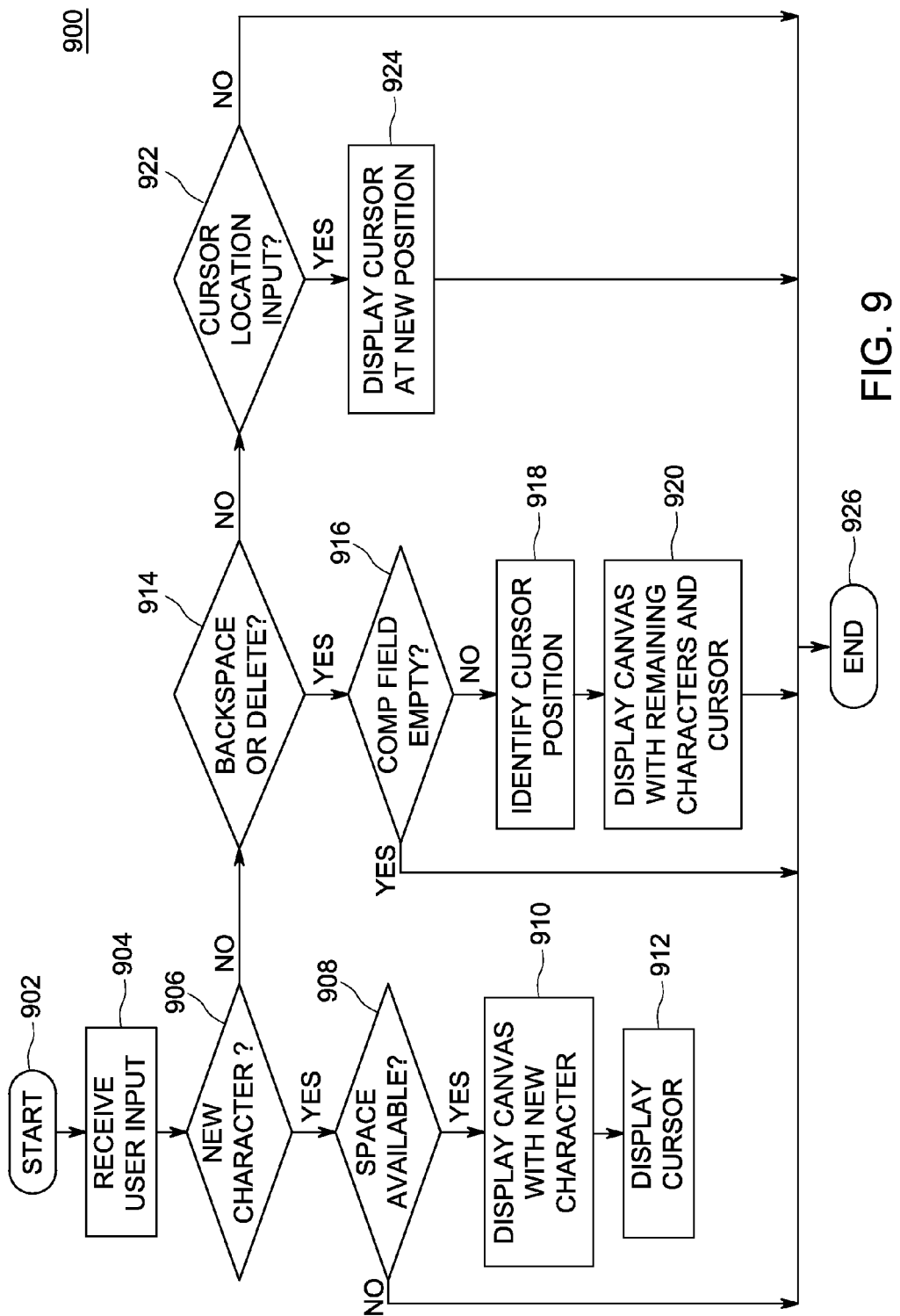
FIG. 9 depicts a flow diagram of a method for processing a user input for editing a mobile platform canvas as an exemplary implementation of the reception module of FIG. 1, according to one or more embodiments.

FIG. 9 depicts a flow diagram of a method 900 for processing a user input for editing a mobile platform canvas as an exemplary implementation of the reception module 114 of FIG. 1, according to one or more embodiments. The method 900, according to one embodiment, receives a user input associated with the comb field, and processes the input for editing the input on the mobile platform canvas, such that the edit appears to occur at a corresponding position in the comb field.

The method 900 starts at step 902, and proceeds to step 904. At step 904, the method 900 receives a user input. The method 900 proceeds to step 906. At step 906, the method 900 determines whether the user input is a new character. If the method 900 determines that the user input is a new character, the method 900 proceeds to step 908. At step 908, the method 900 determines if there is space available in the mobile platform canvas (or correspondingly the comb field) for the new character. The number of cells in the comb field is determined at the time the form is created. This number is compared to the number of characters input by the user. If at the step 908, the method 900 determines that space is available for the new character, the method 900 proceeds to step 910. At step 910, the method 900 adds the new character to the display according to method 700 described above. The method 900 proceeds to step 912. At step 912, the method 900 displays the cursor at its proper location according to method 800 described above. The method 900 proceeds to step 926 and ends. If at step 908, the method 900 determines that space is not available for the new character, the method 900 proceeds to step 926 and ends.

If at step 906, the method 900 determines that the user input is not a new character, the method 900 proceeds to step 914. At step 914, the method 900 determines if the user input is a "delete" command. If at step 914 the method 900 determines that the user input is a "delete" command, the method 900 proceeds to step 916. At step 916, the method 900 determines whether the mobile platform canvas is empty. If the method 900 determines the mobile platform canvas is empty, the method 900 proceeds to step 926 and ends. If at step 916, the method 900 determines the mobile platform canvas is not empty, the method 900 proceeds to step 918. At step 918, the method 900 identifies the current position of the cursor. The location of the cursor when a user inputs a "delete" command determines the character to be deleted. The method 900 proceeds to step 920. At step 920, the method 900 displays the characters in the mobile platform canvas as provided in method 700 above, excluding the deleted character. The method 900 then displays the cursor as provided in method 800 above. The method 900 proceeds to step 926 and ends.

If at step 914, the method 900 determines that the user input is not a "delete" command, the method 900 proceeds to step 922. At step 922, the method 900 determines whether the user input is a cursor location input. If the user is a cursor location input, the method 900 proceeds to step 924. At step 924, the cursor position is updated to a position as input by the user using method 800 described above. The method 900 proceeds to step 926 and ends. If at the step 922, the user input is not a cursor location input, the method 900 proceeds to step 926 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 10:
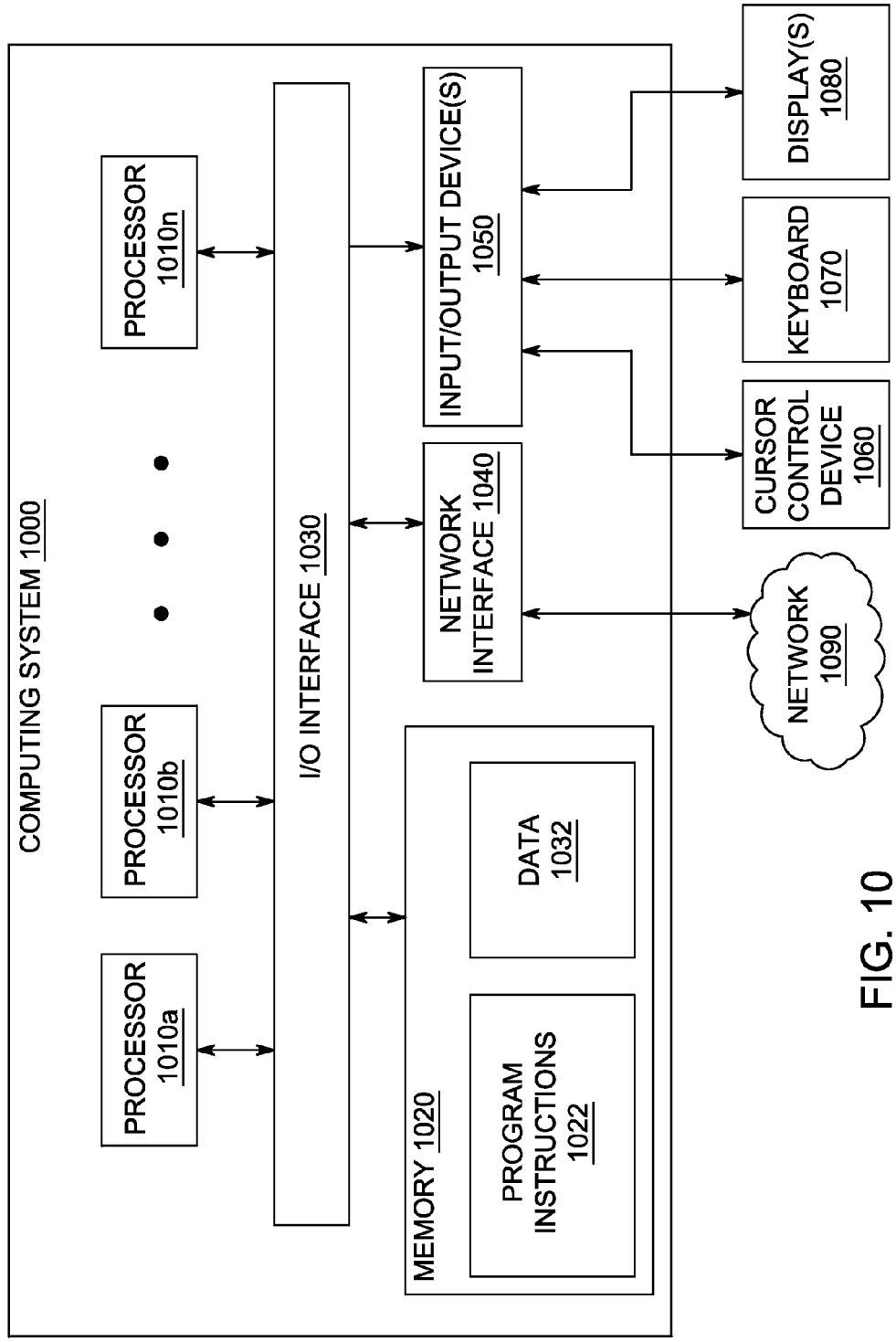
FIG. 10 depicts a computer system that can be utilized in various embodiments of the present invention, according to one or more embodiments.

FIG. 10 depicts a computer system that can be utilized in various embodiments of the present invention, according to one or more embodiments.

Various embodiments of an apparatus and method for providing comb text field inputs on a mobile device, as described herein, may be executed on one or more computer systems, which may interact with various other devices. One such computer system is computer system 1000 illustrated by FIG. 10, which may in various embodiments implement any of the elements or functionality illustrated in FIGS. 1-9. In various embodiments, computer system 1000 may be configured to implement methods described above. The computer system 1000 may be used to implement any other system, device, element, functionality or method of the above-described embodiments. In the illustrated embodiments, computer system 1000 may be configured to implement methods 500, 600, 700, 800 and 900, as processor-executable executable program instructions 1022 (e.g., program instructions executable by processor(s) 1010) in various embodiments.

In the illustrated embodiment, computer system 1000 includes one or more processors 1010 coupled to a system memory 1020 via an input/output (I/O) interface 1030. The computer system 1000 further includes a network interface 1040 coupled to I/O interface 1030, and one or more input/output devices 1050, such as cursor control device 1060, keyboard 1070, and display(s) 1080. In various embodiments, any of components may be utilized by the system to receive user input described above. In various embodiments, a user interface (e.g., user interface) may be generated and displayed on display 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements. In another example, multiple nodes may implement computer system 1000 in a distributed manner.

In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x96, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one components (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1090), such as one or more external systems or between nodes of computer system 1000. In various embodiments, network 1090 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the methods described above, such as the methods illustrated by the flowcharts of FIGS. 5, 6, 7, 8 and 9. In other embodiments, different elements and data may be included.

Those skilled in the art will appreciate that computer system 1000 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
    displaying a document on a mobile device;
    detecting entry of a comb field of the document on the mobile device, the comb field comprising at least one comb cell;
    determining a size of a canvas that fits onto the comb field on the mobile device; and
    generating a mobile platform canvas based on the comb field parameters, the mobile platform canvas capable of receiving at least one text character input.

2. The method of claim 1, wherein the comb field parameters comprise at least one of a predefined number of cell(s) associated with the comb field, a size of the cell(s), location of the comb field in the document, value of the comb field, and font used in the comb field.

3. The method of claim 1, wherein the at least one text character input is able to be displayed in the mobile platform canvas.

4. The method of claim 3, wherein the mobile platform canvas is superimposed on the corresponding comb field, and wherein the input is displayed on the mobile platform canvas such that each character of the input appears to be located in the individual cell(s) of the comb field in a sequence as provided in the input.

5. The method of claim 4, wherein a movable cursor is displayed at the end of the input, and wherein the movable cursor can be displayed at any position within the mobile platform canvas.

6. The method of claim 5, wherein the movable cursor is a custom blinking movable cursor.

7. The method of claim 4, wherein display of the input in the mobile platform canvas is based on at least one of an insert operation, and a delete operation.

8. The method of claim 7, wherein display of the input based on an insert operation comprises calculation of a location for all input characters and the movable cursor on the mobile platform canvas and display of the input characters and movable cursor on the mobile platform canvas.

9. The method of claim 7, wherein display of the input based on a delete operation causes calculation of a location for all input characters and the movable cursor on the mobile platform canvas with the deleted character removed, and displays the remaining input characters and movable cursor on the mobile platform canvas.

10. The method of claim 1 further comprising saving the input associated with the comb field when navigation away from the comb field occurs.

11. An apparatus comprising:
a display module that displays a document comprising a comb field, a mobile platform canvas, and input associated with the comb field on the mobile platform canvas;
a reception module that receives an input associated with the comb field of the document, and calculates display coordinates for each input character for display on the mobile platform canvas; and
a comb field parameter data comprising at least one of a predefined number of cell(s) associated with the comb field, size of the cell(s), location of the comb field in the document, value of the comb field, and font used in the comb field,
wherein the reception module calculates the display coordinates for input characters based on the comb field parameters.

12. The apparatus of claim 11, wherein the mobile platform canvas is generated upon entry of the comb field.

13. The apparatus of claim 11, wherein the mobile platform canvas is superimposed on the corresponding comb field, and wherein the input is displayed on the mobile platform canvas such that each character of the input appears to be located in the individual cell(s) of the comb field in a sequence as provided in the input.

14. A non-transient computer readable storage medium having instructions for providing comb text field inputs on a mobile device that, when executed by a computing system, cause a computing system to perform:
displaying a document on a mobile device;
detecting entry of a comb field of the document on the mobile device, the comb field comprising at least one comb cell;
determining a size of a canvas that fits onto the comb field on the mobile device; and
generating a mobile platform canvas based on the comb field parameters, the mobile platform canvas capable of receiving at least one text character input.

15. The non-transient computer readable storage medium of claim 14, wherein the comb field parameters comprise at least one of a predefined number of cell(s) associated with the comb field, a size of the cell(s), location of the comb field in the document, value of the comb field, and font used in the comb field.

16. The non-transient computer readable storage medium of claim 14, wherein the computer readable storage medium further causes the computer to perform displaying the input in the mobile platform canvas.

17. The non-transient computer readable storage medium of claim 16, wherein the mobile platform canvas is superimposed on the corresponding comb field, and wherein the input is displayed on the mobile platform canvas such that each character of the input appears to be located in the individual cell(s) of the comb field in a sequence as provided in the input.

18. The non-transient computer readable storage medium of claim 17, wherein a movable cursor is displayed at the end of the input, and wherein the movable cursor can be displayed at any position within the mobile platform canvas.

19. The non-transient computer readable storage medium of claim 18, wherein the movable cursor is a custom blinking movable cursor.

20. The non-transient computer readable storage medium of claim 14, wherein the computer readable program when executed on the computer causes the computer to edit the display of at least a part of the input based on at least one of an insert operation, and a delete operation.

* * * * *